US007330961B2

(12) United States Patent
Sakata et al.

(10) Patent No.: US 7,330,961 B2
(45) Date of Patent: Feb. 12, 2008

(54) CACHE CONTROL METHOD AND PROCESSOR SYSTEM

(75) Inventors: Hideki Sakata, Kawasaki (JP); Tatsumi Nakada, Kawasaki (JP); Eiki Ito, Kawasaki (JP); Akira Nodomi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 355 days.

(21) Appl. No.: 11/009,466

(22) Filed: Dec. 13, 2004

(65) Prior Publication Data

US 2005/0102473 A1 May 12, 2005

Related U.S. Application Data

(63) Continuation of application No. PCT/JP02/12186, filed on Nov. 21, 2002.

(51) Int. Cl.
*G06F 12/00* (2006.01)
*G06F 12/08* (2006.01)

(52) U.S. Cl. .............................. 711/210; 711/3; 711/203

(58) Field of Classification Search ...................... None
See application file for complete search history.

(56) References Cited

U.S. PATENT DOCUMENTS

| 4,400,770 A | 8/1983 | Chan et al. |
| 5,257,361 A | 10/1993 | Doi et al. |
| 5,392,416 A | 2/1995 | Doi et al. |
| 5,479,630 A * | 12/1995 | Killian ........................... 711/3 |
| 5,526,509 A | 6/1996 | Doi et al. |
| 5,668,968 A * | 9/1997 | Wu ................................. 711/3 |
| 5,699,551 A * | 12/1997 | Taylor et al. ................ 711/207 |
| 5,996,048 A * | 11/1999 | Cherabuddi et al. ......... 711/122 |

FOREIGN PATENT DOCUMENTS

| JP | 57-88586 | 6/1982 |
| JP | 3-83150 | 4/1991 |
| JP | 3-142644 | 6/1991 |
| JP | 6-83711 | 3/1994 |
| JP | 7-287668 | 10/1995 |
| JP | 8-6852 | 1/1996 |
| WO | WO 95/13584 | 5/1995 |
| WO | WO2004/046932 | 6/2004 |

OTHER PUBLICATIONS

David Patterson and John Hennessy, Computer Architecture A Quantitative Approach 1996, Morgan Kaufmann Publishers, Second Edition, pp. 677-685.*

* cited by examiner

*Primary Examiner*—Reginald Bragdon
*Assistant Examiner*—Shawn Gu
(74) *Attorney, Agent, or Firm*—Staas & Halsey LLP

(57) ABSTRACT

A cache control method controls data sharing conditions in a processor system having multi-level caches that are in an inclusion relationship. The cache control method indexes an upper level cache by a real address and indexes a lower level cache by a virtual address, and prevents a real address that is referred by a plurality of different virtual addresses from being registered a plurality of times within the same cache. A plurality of virtual addresses are registrable within the upper level cache, so as to relax the data sharing conditions.

16 Claims, 11 Drawing Sheets

L1 CACHE

L2 CACHE

CACHE CONTROL METHOD AND PROCESSOR SYSTEM

This application is a continuation application filed under 35 U.S.C. 111(a) claiming the benefit under 35 U.S.C. 120 and 365(c) of a PCT International Application No.PCT/JP2002/012186 filed Nov. 21, 2002, in the Japanese Patent Office, the disclosure of which is hereby incorporated by reference.

BACKGROUND OF THE INVENTION

1. Field of the Invention

The present invention generally relates to cache control methods and processor systems, and more particularly to a cache control method for controlling data sharing state (or conditions) when a synonym occurs in multi-level (or hierarchical) caches that are in an inclusion relationship, and to a processor system which employs such a cache control method.

2. Description of the Related Art

In a multi-processor system provided with multi-level caches that are in an inclusion relationship, if an index address of the cache is indexable by a real address, that is, if a Physical address Index Physical address Tag (PIPT) is employed, a number of bits usable as the index address becomes determined by a page size of the multi-processor system. Accordingly, a total capacity of the caches is equal to a product of the page size and a number of ways.

According to the PIPT, no synonym occurs because the index address of the cache is indexed by the real address and a match is detected by the real address. However, since a page boundary cannot be exceeded, there is a limit to the capacity per way.

As a method that does not generate such a limit to the capacity, there is a method which indexes a Translation Look-ahead Buffer (TLB) and obtains a real address corresponding to a virtual address, so as to make the indexing by the real address. However, this method indexes the cache based on the result of indexing the TLB, a cache latency is increased.

A Virtual address Index Physical address Tag (VIPT), which makes the indexing by the virtual address and not by the real address, has been proposed. According to the VIPT, the index address of the cache is indexed by the virtual address, and the match is detected by the real address. For this reason, it is possible to simply realize a capacity that exceeds the page boundary. However, although the VIPT can exceed the page boundary, the synonym occurs.

The synonym refers to a state where a single real address is referred by a plurality of virtual addresses. When the synonym occurs, the cache indexed by the plurality of virtual addresses is actually a single entity, but the data of the same real address is stored in a plurality of entries. Hence, in a case where the data stored in such a manner is to be updated, the data unity cannot be maintained unless the same data stored in each of the plurality of entries is updated.

For this reason, in the conventional multi-processor system, a secondary cache is indexed by the real address, and a portion of a virtual address with respect to this real address is held, so as to check the synonym. There is no time loss since the indexing of the TLB will be ended by the time the secondary cache is accessed. The secondary cache stores a pair of the real address and the virtual address at the time of a previous access, and makes a request to delete the entry with respect to the primary cache when a next access is made by a different combination. Accordingly, only one pair of the real address and the virtual address with respect to the real address always exists in the primary cache, and the data unity can be maintained.

FIG. 1 is a diagram for explaining a cache control operation at the time of an access when no synonym occurs. More particularly, FIG. 1 is a diagram for explaining the cache control operation for a case where data DATA of a real address PA(a) is registered at a virtual address VA(a) in a primary cache 1, and an access to the virtual address VA(a) is generated. A TLB 3 indicates that the data DATA of the real address PA(a) is registered in the primary cache 1 at the virtual address VA(a). In this case, a hit occurs since the virtual address VA(a) to which the access is generated matches the virtual address VA(a) that is registered in the primary cache 1.

FIG. 2 is a diagram for explaining a cache control operation at the time of an access when a synonym occurs. More particularly, FIG. 2 is a diagram for explaining the cache control operation for a case where the data DATA of the real address PA(a) is registered at a virtual address VA(b) in the primary cache 1, and an access to the virtual address VA(a) is generated, that is, the synonym occurs. In this case, a miss occurs because the virtual address VA(a) to which the access is generated does not match the virtual address VA(b) that is registered in the primary cache 1. The virtual address VA(b), the real address PA(a) and the data DATA are registered in correspondence with one another in a secondary cache 2. Accordingly, by indexing the secondary cache 2 by the real address PA(a) from the TLB 3, it can be seen that the data DATA of the real address PA(a) is registered in the primary cache 1 at the virtual address VA(b). Hence, by generating a delete request DEL requesting the primary cache 1 to delete the entry of the virtual address VA(b) and notifying the secondary cache 2 that the entry of the virtual address VA(b) of the primary cache 1 has been deleted, the entries of the virtual address VA(b) of the primary cache 1 and the secondary cache 2 are reregistered as the entries of the virtual address VA(a). Thereafter, the data DATA is transferred from the secondary cache 2 to the primary cache 1 as corresponding to the virtual address VA(a).

FIG. 3 is a diagram showing a state after the delete request DEL shown in FIG. 2 is processed when the synonym occurs. As shown in FIG. 3, the registration of the virtual address VA(b) is deleted from the primary cache 1 and the secondary cache 2, and only the virtual address VA(a) is registered in the primary cache 1 and the secondary cache 2.

Therefore, according to the conventional multi-processor system, the delete request DEL described above must be processed every time the synonym occurs, so as to eliminate the synonym state. Consequently, because of the need to carry out the process for eliminating the synonym state, there were problems in that a memory access time of the multi-processor system is long, and it is difficult to improve the memory utilization efficiency.

The inventors are aware of the following prior art.

Japanese Laid-Open Patent Application No.7-287668
Japanese Laid-Open Patent Application No.9-504627
Japanese Laid-Open Patent Application No.3-83150

SUMMARY OF THE INVENTION

Accordingly, it is a general object of the present invention to provide a novel and useful cache control method and processor system, in which the problems described above are suppressed.

Another and more specific object of the present invention is to provide a cache control method and a processor system, which can reduce the memory access time and improve the memory utilization efficiency, by relaxing data sharing conditions and simplifying operations related to elimination of the synonym state.

Still another object of the present invention is to provide a cache control method for controlling data sharing conditions in a processor system having multi-level caches that are in an inclusion relationship, comprising indexing an upper level cache by a real address and indexing a lower level cache by a virtual address, and preventing a real address that is referred by a plurality of different virtual addresses from being registered a plurality of times within the same cache, and enabling registration of a plurality of virtual addresses within the upper level cache, so as to relax the data sharing conditions. According to the cache control method of the present invention, it is possible to reduce the memory access time and improve the memory utilization efficiency, by relaxing the data sharing conditions and simplifying operations related to elimination of the synonym state.

A further object of the present invention is to provide a processor system having multi-level caches that are in an inclusion relationship, comprising an upper level cache configured to be indexed by a real address, a lower level cache configured to be indexed by a virtual address, and a mechanism configured to prevent a real address that is referred by a plurality of different virtual addresses from being registered a plurality of times within the same cache, wherein a plurality of virtual addresses are registrable within the upper level cache, so as to relax data sharing conditions. According to the processor system of the present invention, it is possible to reduce the memory access time and improve the memory utilization efficiency, by relaxing the data sharing conditions and simplifying operations related to elimination of the synonym state.

Other objects and further features of the present invention will be apparent from the following detailed description when read in conjunction with the accompanying drawings.

DESCRIPTION OF THE PREFERRED EMBODIMENTS

A description will be given of embodiments of a cache control method and a processor system according to the present invention, by referring to FIG. 4 and the subsequent drawings.

First, a description will be given of an operating principle of the present invention, by referring to FIGS. 4 through 7.

Figure 4:
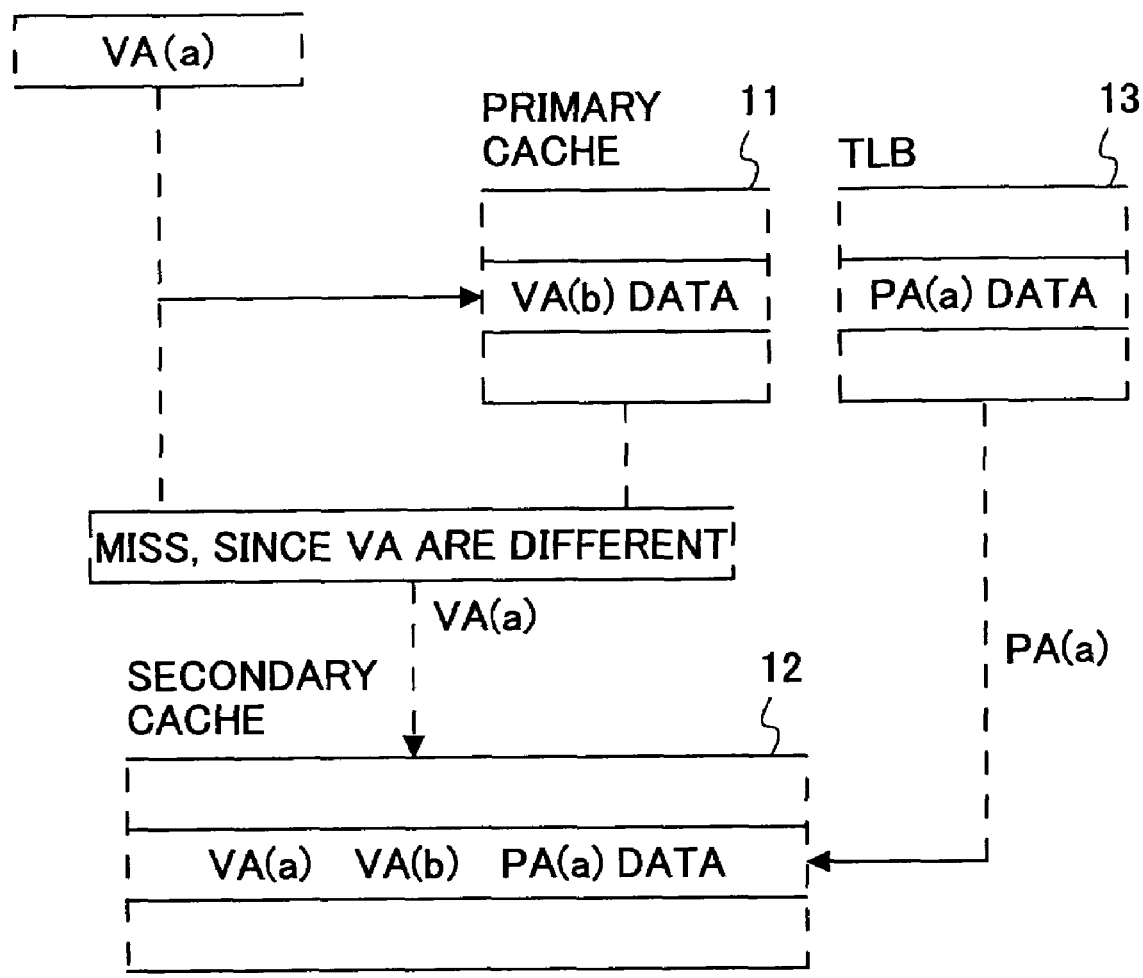
FIG. 4 is a diagram for explaining a cache control operation of the present invention at the time of an access when a synonym occurs.

FIG. 4 is a diagram for explaining a cache control operation of the present invention at the time of an access when a synonym occurs in a multi-processor system provided with multi-level caches that are in an inclusion relationship. More particularly, FIG. 4 is a diagram for explaining a cache control operation for a case where data DATA of a real address PA(a) is registered at a virtual address VA(b) of a primary cache 11 in an upper level, a virtual address VA(a), the virtual address VA(b), the real address PA(a) and the data DATA are registered in correspondence with one another in a secondary cache 12 in a lower level, and an access (access request) to the virtual address VA(a) is generated. In this case, a miss occurs since the virtual address VA(a) to which the access is generated does not match the virtual address VA(b) tat is registered in the primary cache 11. A TLB 13 indicates that the data DATA of the real address PA(a) is registered in the primary cache 11 at the virtual address VA(a).

When the synonym occurs in such a manner, it is possible to know that the data DATA of the real address PA(a) is registered in the primary cache 11 at the virtual address VA(b), by indexing the secondary cache 12 by the real address PA(a) from the TLB 13, because the virtual address VA(a), the virtual address VA(b), the real address PA(a) and the data DATA are registered in correspondence with one another in the secondary cache 12. But in the present invention, the data DATA is thereafter transferred from the secondary cache 12 to the primary cache 11 as data corresponding to the virtual address VA(a), without generating with respect to the primary cache 11 a delete request DEL that requests deletion of the entry of the virtual address VA(b).

Figure 5:
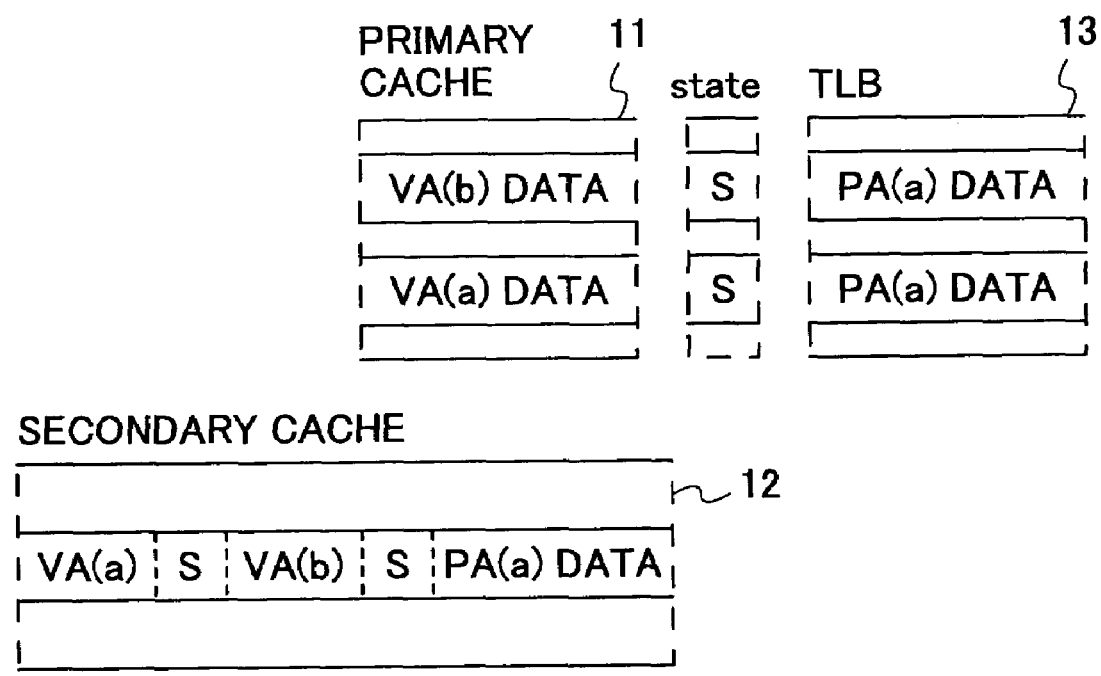
FIG. 5 is a diagram showing a state after data is transferred to a primary cache from a state shown in FIG. 4.

FIG. 5 is a diagram showing a state after the data DATA is transferred to the primary cache 11 as the data corresponding to the virtual address VA(a) from a state shown in FIG. 4. As shown in FIG. 5, the primary cache 11 has 2 entries of the same real address PA(a). Such a state shown in FIG. 5 introduces no problems as long as only a reference is made with respect to each entry. But when an updating is made with respect to one of the entries, contents of the 2 entries no longer match. Hence, the present invention extends a tag of the cache, and adds a state related to an operating right with respect to the data DATA. The tag state may indicate one of 3 states M, S and I. The state M indicates that an updating is possible, the state S. indicates that only a reference is possible, and the state I indicates that the entry is invalid. Accordingly, the tag state after the virtual address VA(a) is accessed in FIG. 4 becomes as shown in FIG. 5. In the particular case shown in FIG. 5, the access to the virtual address VA(a) and the virtual address VA(b) is limited to only making a reference because the tag state indicates the state S.

In the particular case described above, there are 2 pairs of virtual and real addresses, namely, the pair formed by the virtual address VA(a) and the real address PA(a), and the pair formed by the virtual address VA(b) and the real address PA(a). However, the number of pairs of the virtual and real addresses is of course not limited to 2.

Therefore, according to the present invention, the data DATA of the same real address PA(a) can be registered at a plurality of different virtual addresses, such as the virtual addresses VA(a) and VA(b). For this reason, a cache control procedure for the case shown in FIG. 4 basically includes the following steps (1) through (4) and is extremely simple.

Step (1): Detect miss of the primary cache 11;

Step (2): Detect index (registered virtual address VA(a)) of the secondary cache 12;

Step (3): Transfer the data DATA from the secondary cache 12 to the primary cache 11; and Step (4): Register the virtual address VA(a) in the primary cache 11.

Figure 1:
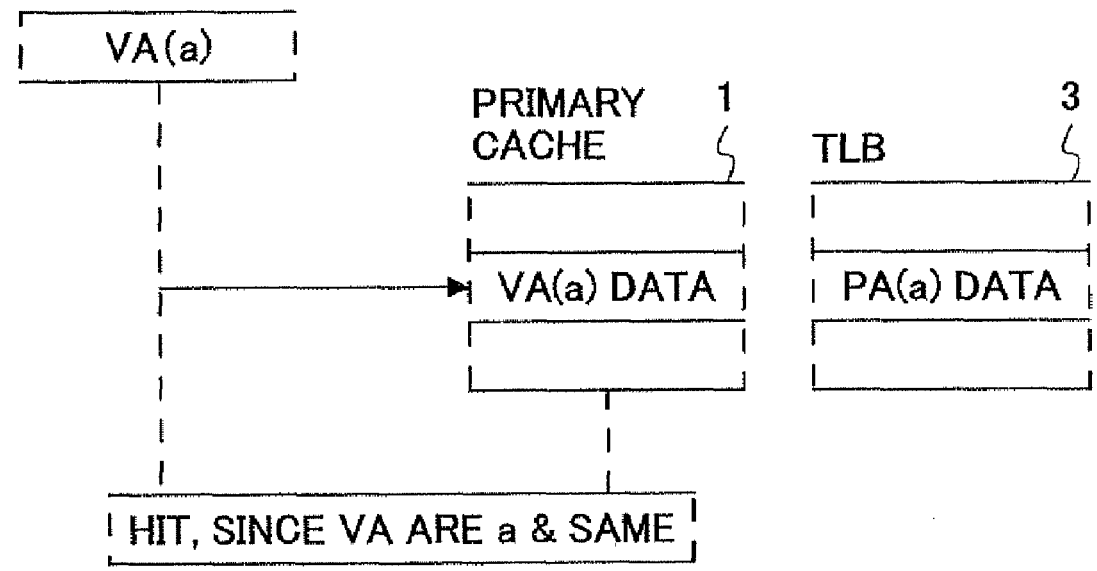
FIG. 1 is a diagram for explaining a cache control operation at the time of an access when no synonym occurs.
Figure 2:
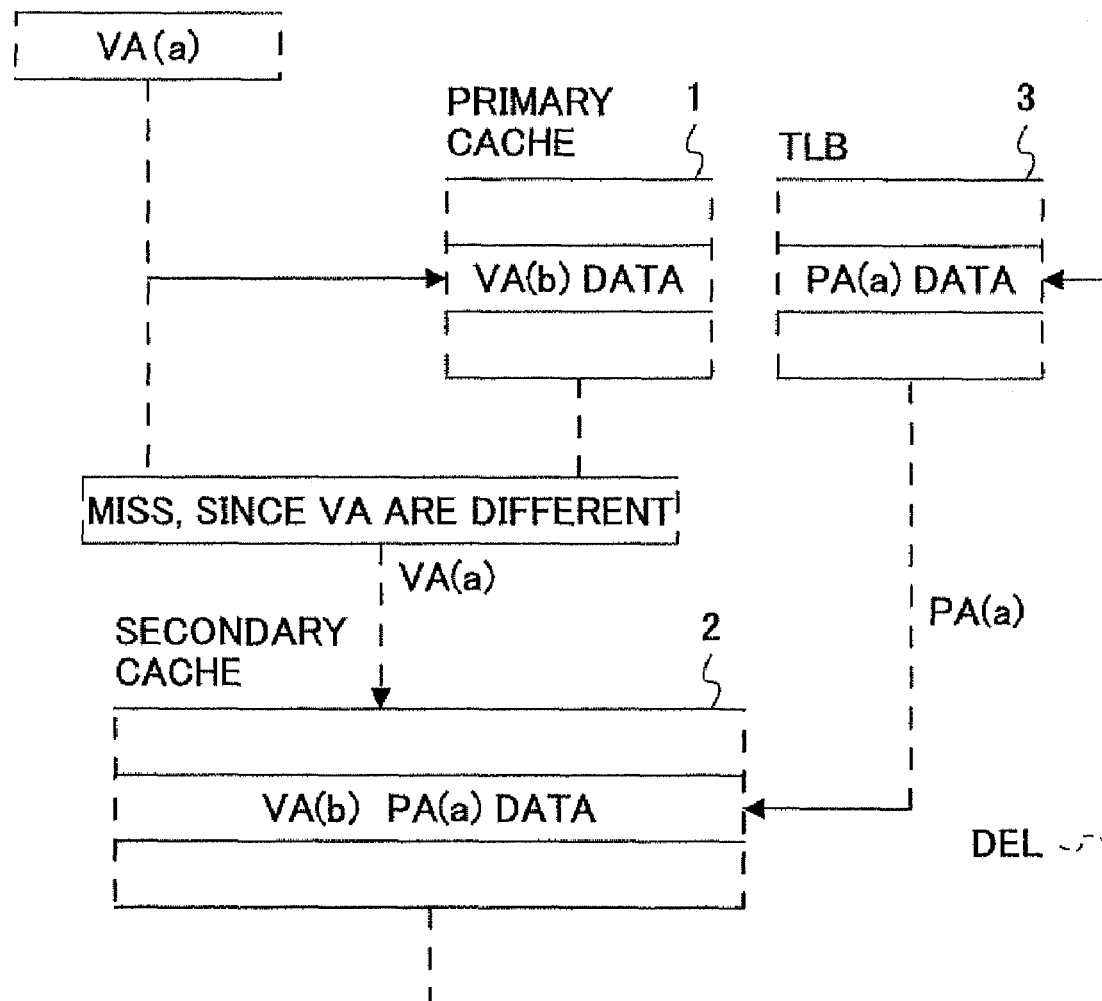
FIG. 2 is a diagram for explaining a cache control operation at the time of an access when a synonym occurs.
Figure 3:
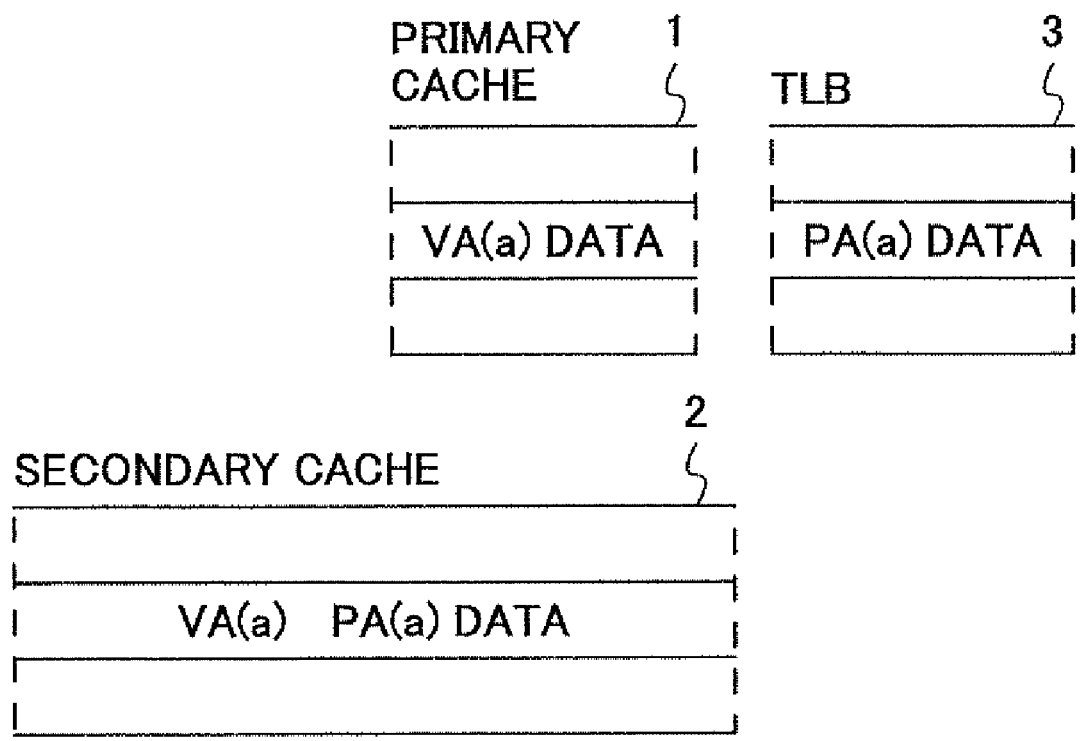
FIG. 3 is a diagram showing a state after a delete request shown in FIG. 2 is processed when the synonym occurs.

On the other hand, as described above in conjunction with FIG. 2, the conventional multi-processor system requires a step of generating the delete request DEL for deleting the entry of the virtual address VA(b) with respect to the primary cache 1, and a step of notifying the deletion of the entry of the virtual address VA(b) of the primary cache 1 to the secondary cache 2, between the steps (2) and (3) of the present invention. Unless these additional steps are provided in the conventional multi-processor system, it is impossible to reregister the entry of the virtual address VA(b) of the primary cache 1 and the secondary cache 2 as the entry of the virtual address VA(a).

Figure 6:
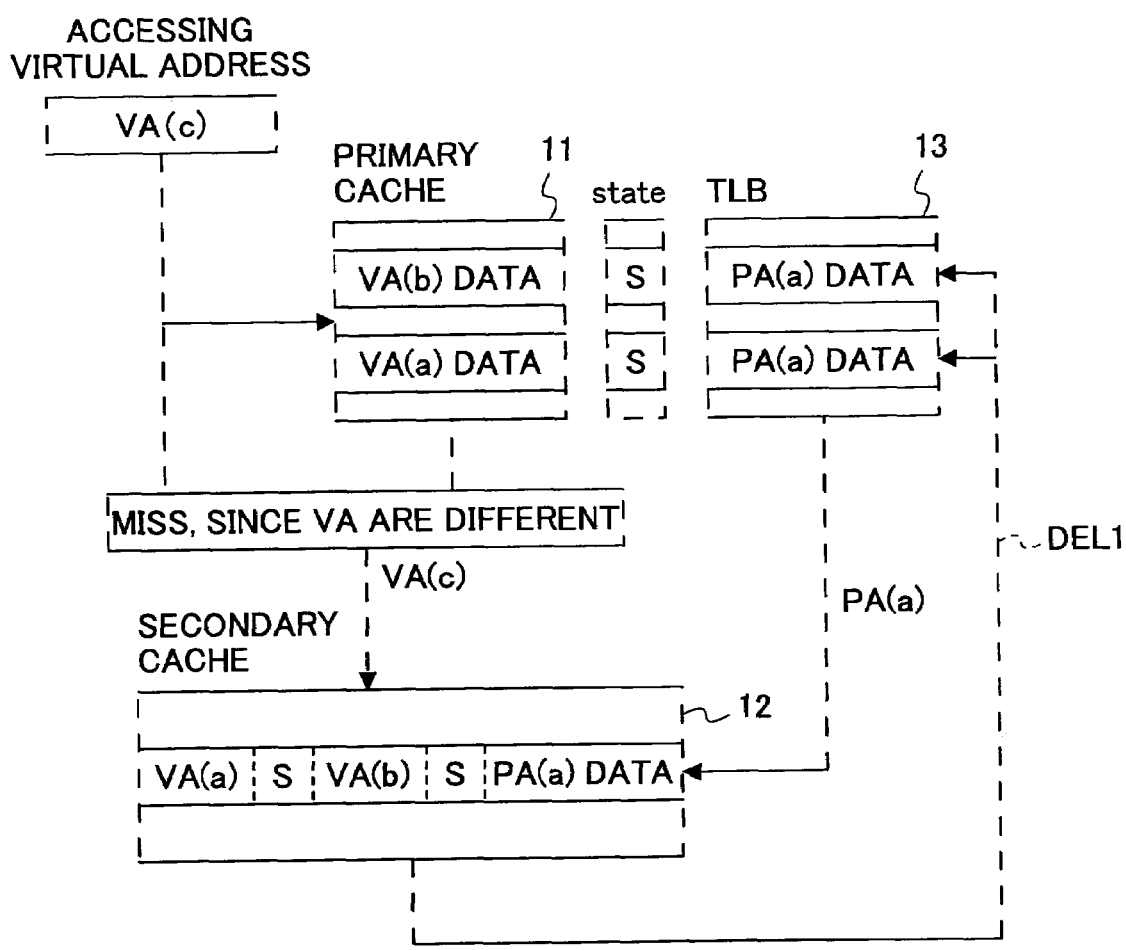
FIG. 6 is a diagram for explaining a cache control operation for a case where a store access is generated in the state shown in FIG. 5.

FIG. 6 is a diagram for explaining a cache control operation for a case where a store access (store access request or update request) of a virtual address VA(c) indicating the real address PA(a) is generated in the state shown in FIG. 5. In this case, a miss occurs because the virtual address VA(c) to which the access is generated does not match the virtual addresses VA(b) and VA(a) that are registered in the primary cache 1. The TLB 13 indicates that the data DATA of the real address PA(a) is registered in the primary cache 11 at the virtual address VA(a).

When the synonym occurs in such a manner, it is possible to know that the data DATA of the real address PA(a) is not registered in the primary cache 11 at the virtual address VA(c), by indexing the secondary cache 12 by the real address PA(a) from the TLB 13, because the virtual address VA(a), the virtual address VA(b), the real address PA(a) and the data DATA are registered in correspondence with one another in the secondary cache 12. Hence, a delete request DEL is generated with respect to the primary cache 11 requesting deletion of the entries of the virtual addresses VA(b) and VA(a) registered in the tag state S, and the deletion of the entries of the virtual addresses VA(b) and VA(a) in the primary cache 11 is notified with respect to the secondary cache 12. As a result, it is possible to reregister the entries of the virtual addresses VA(b) and VA(a) in the primary cache 11 and the secondary cache 12 as an entry of the virtual address VA(c), and to set the virtual address VA(c) to the tag state M. Thereafter, the data DATA is transferred from the secondary cache 12 to the primary cache 11 as the data corresponding to the virtual address VA(c).

Figure 7:
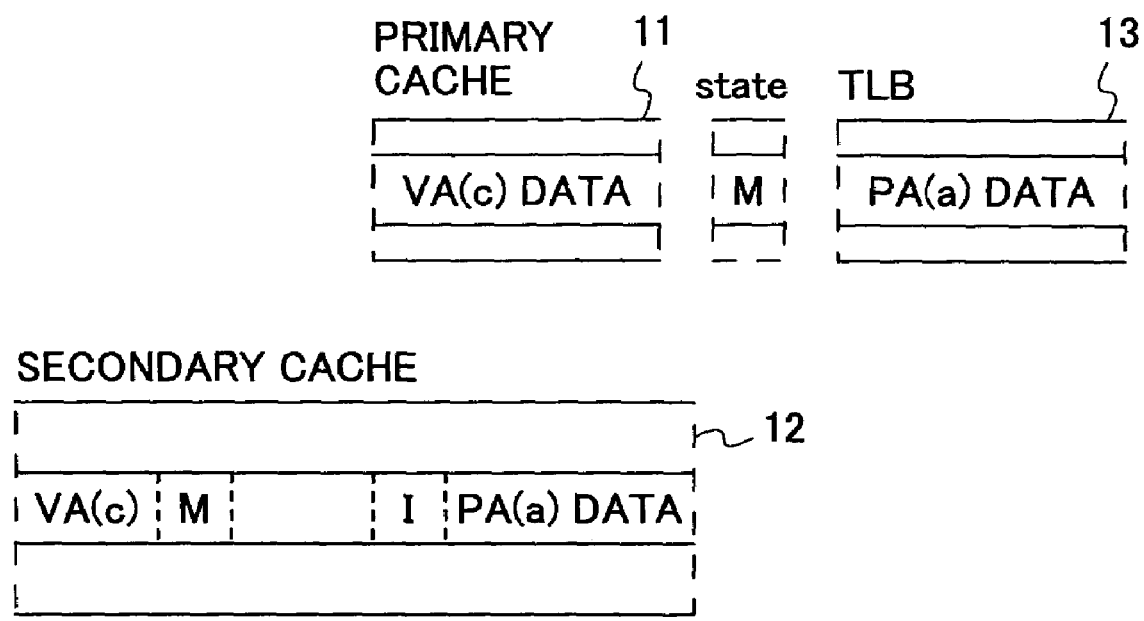
FIG. 7 is a diagram showing a state after the data is transferred to the primary cache from a state shown in FIG. 6.

FIG. 7 is a diagram showing a state after the data DATA is transferred to the primary cache 11 as the data corresponding to the virtual address VA(c) from the state shown in FIG. 6. As shown in FIG. 7, the primary cache 11 only has a single entry with respect to the single real address PA(a). Similarly, the secondary cache 12 only has a single entry with respect to the single real address PA(a). Hence, with respect to the same real address PA(a), only one entry having the tag state M exists.

According to the present invention, when the synonym detection and the exclusive right control are carried out on the side of the secondary cache 12, it is possible to reduce the memory access time and to improve the memory utilization efficiency, by extending a virtual address field of the secondary cache 12 to relax data sharing states (conditions) and simplifying operations related to elimination of the synonym state.

Next, a description will be given of an embodiment of the processor system according to the present invention. This embodiment of the processor system employs an embodiment of the cache control method according to the present invention. In this embodiment, the present invention is applied to a multi-processor system.

Figure 8:
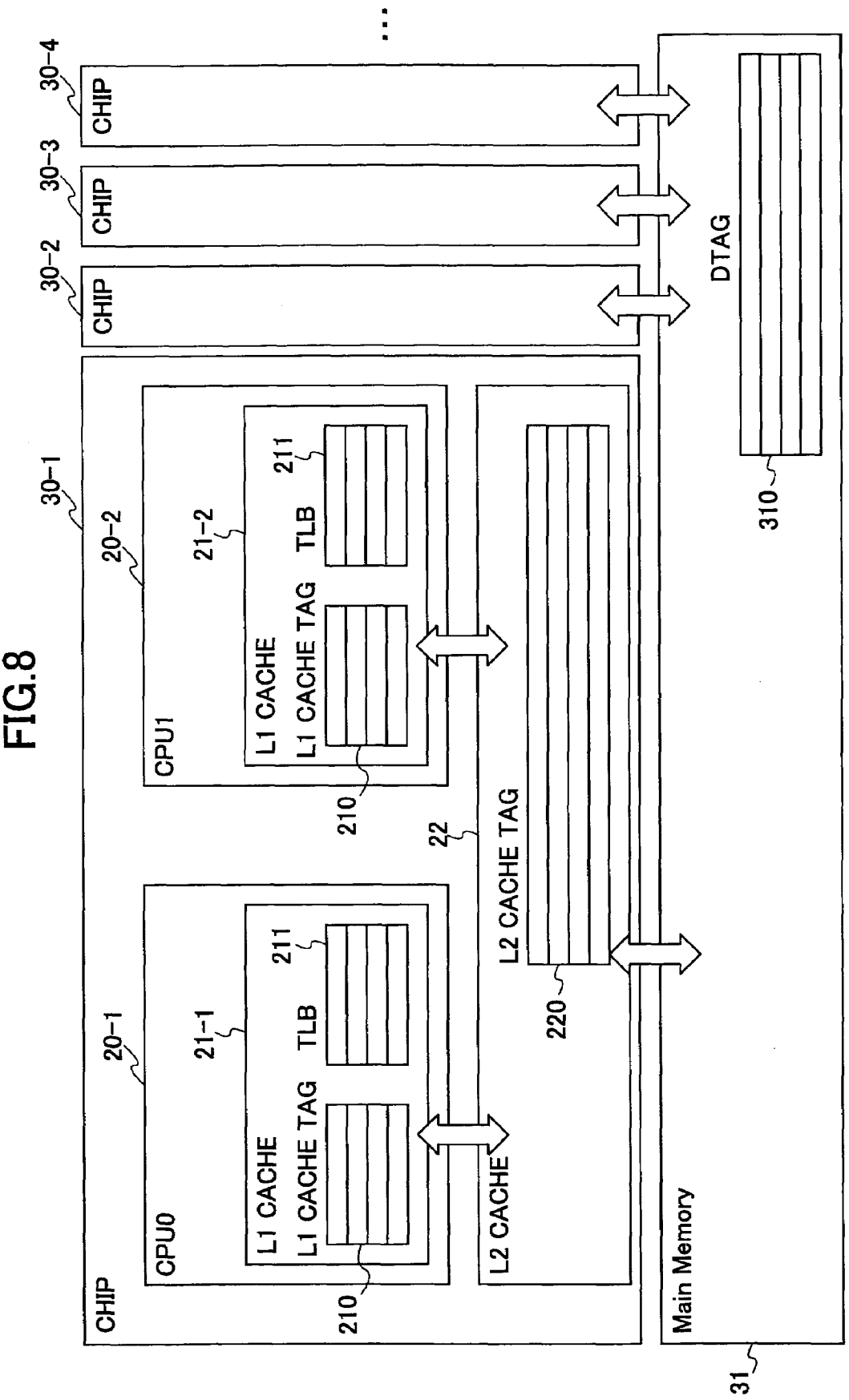
FIG. 8 is a system block diagram showing an embodiment of a processor system according to the present invention.

FIG. 8 is a system block diagram showing an embodiment of a processor system according to the present invention. The multi-processor system shown in FIG. 8 includes a plurality of processor chips (CHIPs) 30-1 through 30-4 and a main memory 31. Only the structure of the processor chip 30-1 is shown in FIG. 8, because each of the processor chips 30-1 through 3-4 has the same structure. The processor chip 30-1 includes a plurality of CPUs 20-1 and 20-2, and a secondary cache (L2 CACHE) 22 in which data are shared by the CPUs 20-1 and 20-2. The CPU 20-1 has a primary cache (L1 CACHE) 21-1, and the CPU 20-2 has a primary cache (L1 CACHE) 21-2. The processor chips 30-1 through 30-4 are sometimes also referred to as chip multi-processors.

Each of the primary caches 21-1 and 21-2 has an L1 cache tag 210 and a TLB 211. The TLB 211 indicates the data of which real address is stored in the primary cache 21-1 or 21-2 to which the TLB 211 belongs, and also indicates the virtual address of the primary cache 21-1 or 21-2 where the data is registered. The L1 cache tag 210 indicates which address region of the primary cache 21-1 or 21-2 to which the L1 cache tag 210 belongs is registered. The secondary cache 22 includes an L2 cache tag 220. The L2 cache tag 220 indicates which address region of the secondary cache 22 to which the L2 cache tag 220 belongs is registered, and also indicates which address region is registered in each of the primary caches 21-1 and 21-2. The main memory 31 includes a D tag (DTAG) 310. The DTAG 310 indicates which address region is registered in each of the secondary caches 22 of the processor chips 30-1 through 30-4.

The number of processor chips is of course not limited to 4, and may be 1 or more. In addition, the number of CPUs within each processor chip is not limited to 2, and may be more than 2.

The primary caches 21-1 and 21-2 are controlled by the VIPT. The secondary cache 22 is controlled by the PIPT. The secondary cache 22 holds a portion of the virtual address so as to enable deletion of arbitrary data registered in the primary caches 21-1 and 21-2, but does not hold a DTAG. For this reason, even when the number of CPUs provided within each of the processor chips 30-1 through 30-4 increases, it is unnecessary to provide a DTAG having an extremely amount of information.

Figure 9:
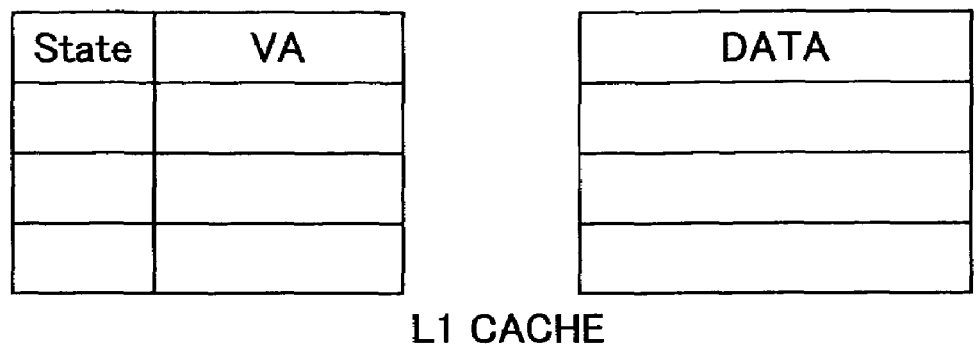
FIG. 9 is a diagram showing tag contents of the primary cache.

FIG. 9 is a diagram showing the tag contents of the primary cache 21-1 or 21-2. As shown in FIG. 9, the L1 cache tag 210 includes a state "State", a virtual address "VA", and data "DATA". Since the primary cache 21-1 or 21-2 is controlled by the VIPT, the portion that is actually registered in the L1 cache tag 210 is the real address PA, but it is illustrated as the virtual address VA to describe its logical meaning.

Figure 10:
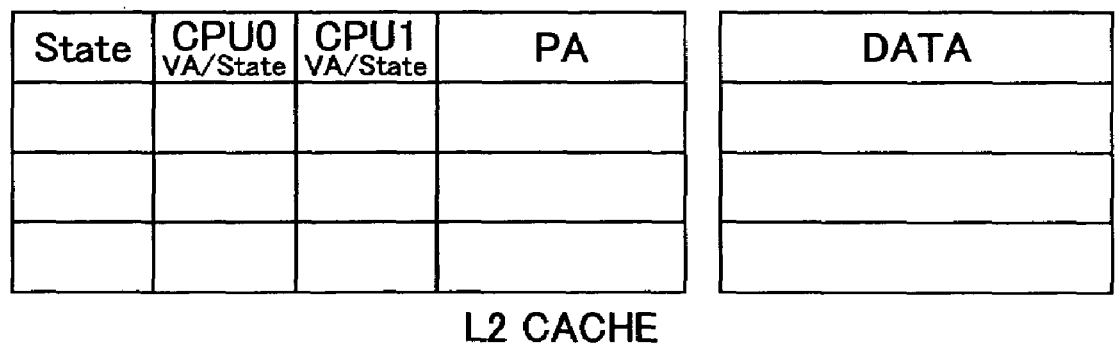
FIG. 10 is a diagram showing tag contents of a secondary cache.

FIG. 10 is a diagram showing the tag contents of the secondary cache 22. As shown in FIG. 10, the L2 cache tag 220 includes a state "State", a "CPU0 VA/State" indicating the virtual address "VA" and the state "State" used by the access from the CPU 20-1, a "CPU1 VA/State" indicating the virtual address "VA" and the state "State" used by the access from the CPU 20-2, and data "DATA". In other words, in order to enable deletion of an arbitrary entry of the primary cache 21-1 or 21-2 that is controlled by the VIPT, the L2 cache tag 220 includes information indicating the virtual address VA at which the registration is made by the CPU 20-1 or 20-2 with respect to the read address PA.

Figure 11:
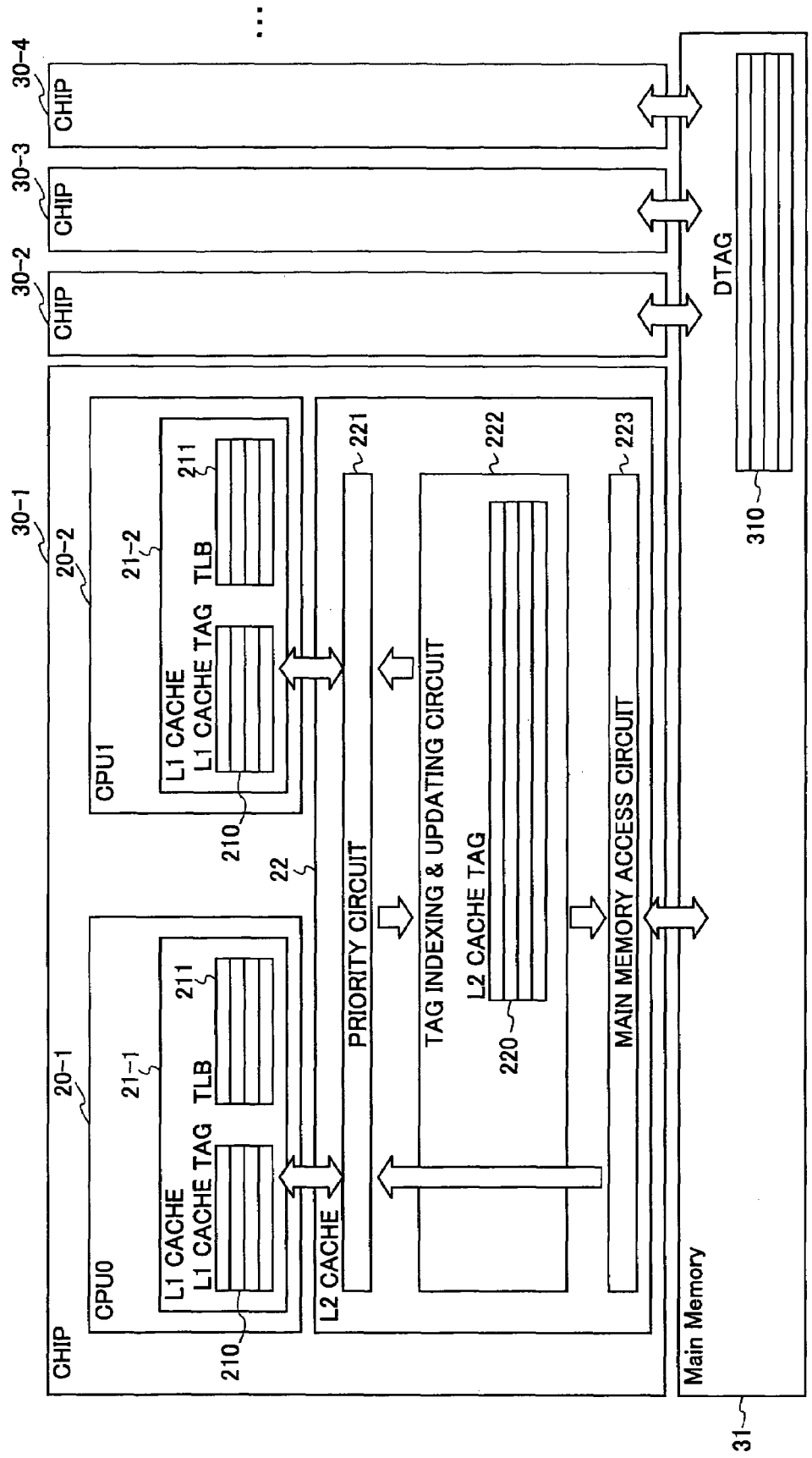
FIG. 11 is a functional block diagram showing the embodiment of the processor system.

FIG. 11 is a functional block diagram showing this embodiment of the processor system. In FIG. 11, those parts which are the same as those corresponding parts in FIG. 8 are designated by the same reference numerals, and a description thereof will be omitted.

In FIG. 11, the secondary cache 22 includes a priority circuit 221, a tag indexing and updating circuit 222 that includes the L2 cache tag 220, and a main memory access circuit 223. The priority circuit 221 carries out an arbitration of the CPUs 20-1 and 20-2 and internal requests. The tag indexing and updating circuit 222 makes an indexing to determine whether or not desired data is registered in the L2 cache tag 220, and updates the L1 cache tag 210 and the L2 cache tag 220 depending on the access request. The main memory access circuit 223 makes access to the main memory 31 and waits for the data from the main memory 31 when supplied with an access request that does not hit the secondary cache 22. When the data from the main memory 31 arrives, the main memory access circuit 223 supplies the data to the priority circuit 221, and the arbitration is carried out in the priority circuit 221 similarly as described above.

Figure 12:
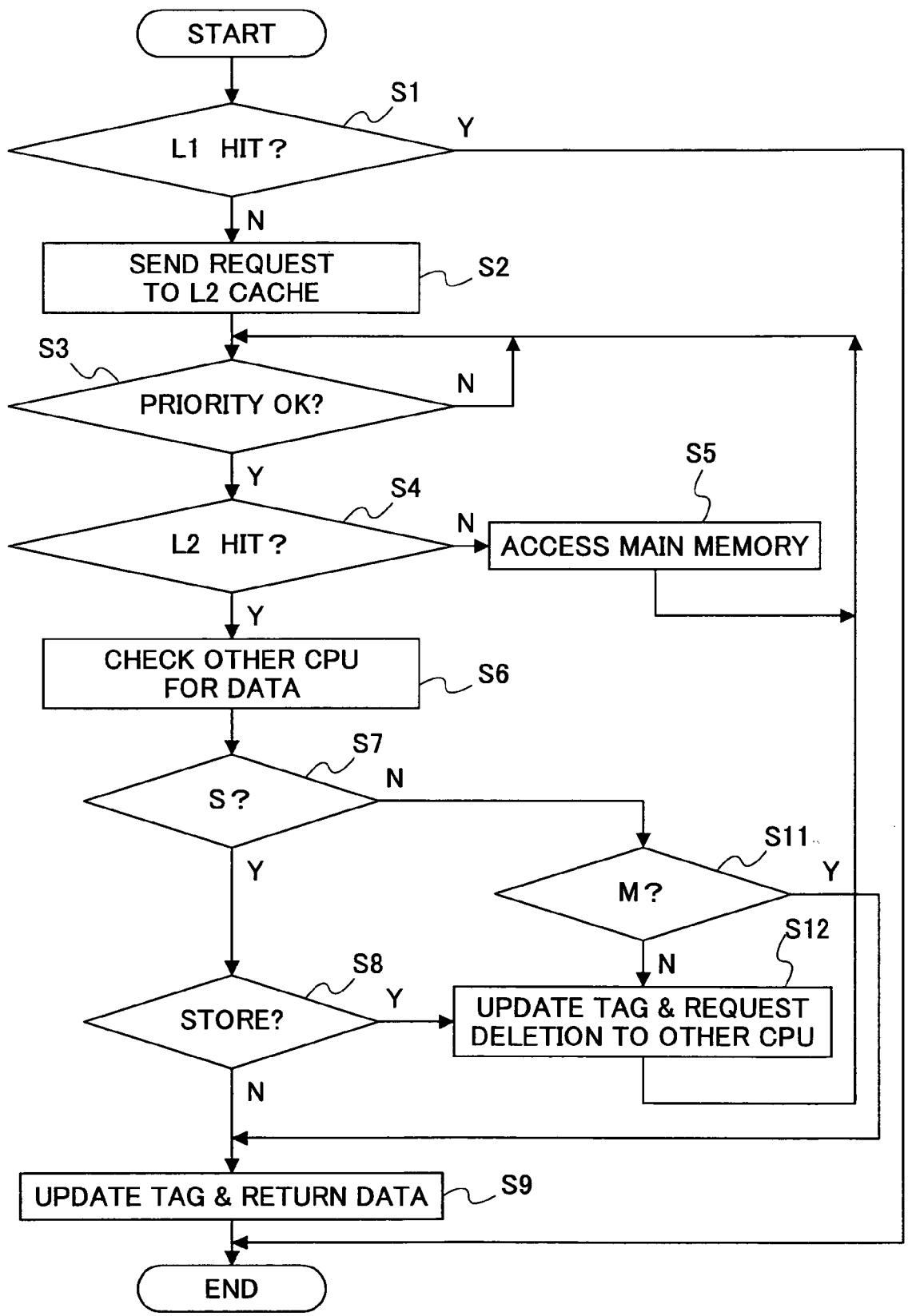
FIG. 12 is a flow chart for explaining the cache control operation.

FIG. 12 is a flow chart for explaining the cache control operation. The cache control operation shown in FIG. 12 is started when the access request is generated from the CPU 20-1 or 20-2 within the chip processor 30-1.

In FIG. 12, a step S1 decides whether or not the access request generated from the CPU 20-1, for example, hits the primary cache 210. The process ends if the decision result in the step S1 is YES. On the other hand, if the decision result in the step S1 is NO, a step S2 sends the access request to the secondary cache 22. A step S3 carries out an arbitration of the access requests in the priority circuit 221, and decides whether or not the arbitration result is normal (OK). The process advances to a step S4 if the decision result in the step S3 is YES.

The step S4 decides by the tag indexing and updating circuit 222 whether or not the access request hit the secondary cache 22. If the decision result in the step S4 is NO, a step S5 makes access to the main memory 31 from the main memory access circuit 223, and the process returns to the step S3. On the other hand, if the decision result in the step S4 is YES, a step S6 checks, by the tag indexing and updating circuit 222, the data of the CPU (CPU 20-2 in this case) within the chip processor 30-1 other than the CPU (CPU 20-1 in this case) at the access request source, that is registered in the secondary cache 22.

A step S7 decides by the tag indexing and updating circuit 222 whether or not the tag state of the data registered in the secondary cache 22 is the tag state S, that is, whether or not only a reference is possible. If the decision result in the step S7 is YES, a step S8 decides by the tag indexing and updating circuit 222 whether or not the access request is a store access request. If the access request is a load access request and the decision result in the step S8 is NO, a step S9 updates the tag by the tag indexing and updating circuit 222 if necessary, returns the accessed data to the CPU 20-1 at the access request source, and the process ends.

If the decision result in the step S7 is NO, a step S11 decides by the tag indexing and updating circuit 222 whether or not the tag state of the data registered in the secondary cache 22 is the tag state M, that is, whether or not the updating is possible. The process advances to the step S9 if the decision result in the step S11 is YES. On the other hand, if the decision result in the step S11 is NO or, if the decision result in the step S8 is YES, a step S12 updates the entries of the primary cache 21 and the secondary cache 22 by the tag indexing and updating circuit 222, requests deletion of the corresponding entries of the primary cache 21 and the secondary cache 22 to the CPU 20-2 that is other than the CPU 20-1 at the access request source by the priority circuit 221, and the process returns to the step S3.

Further, the present invention is not limited to these embodiments, but various variations and modifications may be made without departing from the scope of the present invention.

What is claimed is:

1. A cache control method for controlling a processor system that has a primary cache with an entry configured to register data of a real address at a first virtual address, and a secondary cache with entries configured to register at least one second virtual address different from the first virtual address, the first virtual address, and the real address and the data thereof in a corresponding manner, comprising:
    indexing the primary cache by a virtual address and indexing the secondary cache by a real address; and
    registering a plurality of virtual addresses within the secondary cache without registering a plurality of times within the secondary cache a real address that is referred by a plurality of different virtual addresses, so as to permit the entry of the first virtual address and the entry of the second virtual address that are in a synonym state to coexist within the primary cache.

2. The cache control method as claimed in claim 1, wherein the secondary cache employs a Physical address Index Physical address Tag (PIPT), and the primary cache employs a Virtual address Index Physical address Tag (VIPT).

3. The cache control method as claimed in claim 2, wherein said registering registers a portion of a virtual address a plurality of times within the secondary cache.

4. The cache control method as claimed in claim 1, wherein said registering registers a portion of a virtual address a plurality of times within the secondary cache.

5. The cache control method as claimed in claim 4, further comprising:
    carrying out a synonym detection and an exclusive right control on the primary cache.

6. The cache control method as claimed in claim 1, further comprising:
    carrying out a synonym detection and an exclusive right control on the primary side.

7. The cache control method as claimed in claim 6, wherein the processor system is formed by a multi-processor system.

8. The cache control method as claimed in claim 1, wherein the processor system is formed by a multi-processor system.

9. The cache control method as claimed in claim 1,
    wherein a tag of the primary cache is extended and added with a state related to an operating right with respect to the data registered in the entry of the primary cache, wherein said state is added to each of the first and second virtual addresses registered in the entries of the secondary cache, and wherein said state indicates one of three states consisting of a state indicating that an updating is possible, a state indicating that only a reference is possible, and a state indicating that the entry is invalid.

10. A processor comprising:

a primary cache configured with an entry to register data of a real address at a first virtual address, said primary cache being indexed by a virtual address;

a secondary cache with entries configured to register at least one second virtual address different from the first virtual address, the first virtual address, and the real address and the data thereof in a corresponding manner, said secondary cache being indexed by a real address; and a mechanism configured to register a plurality of virtual addresses within the secondary cache without registering a plurality of times within the secondary cache a real address that is referred by a plurality of different virtual addresses, so as to permit the entry of the first virtual address and the entry of the second virtual address that are in a synonym state to coexist within the primary cache.

11. The processor as claimed in claim 10, wherein the secondary cache employs a Physical address Index Physical address Tag (PIPT), and the primary cache employs a Virtual address Index Physical address Tag (VIPT).

12. The processor as claimed in claim 11, wherein said mechanism registers a portion of a virtual address a plurality of times within the secondary cache.

13. The processor as claimed in claim 10, wherein said mechanism registers a portion of a virtual address a plurality of times within the secondary cache.

14. The processor system as claimed in claim 13, wherein said mechanism carries out a synonym detection and an exclusive right control on the primary cache.

15. The processor system as claimed in claim 10, wherein said mechanism carries out a synonym detection and an exclusive right control on the primary cache.

16. The processor as claimed in claim 10, wherein a tag of the primary cache is extended and added with a state related to an operating right with respect to the data registered in the, entry of the primary cache;

wherein said state is added to each of the first and second virtual address registered in the entries of the secondary cache; and wherein said state indicates one of three states consisting of a state indicating that an updating is possible, an state indicating that an updating is possible, a state indicating that only a reference is possible, and state indicating that the entry is invalid.

* * * * *

UNITED STATES PATENT AND TRADEMARK OFFICE
CERTIFICATE OF CORRECTION

| | |
|---|---|
| PATENT NO. | : 7,330,961 B2 |
| APPLICATION NO. | : 11/009466 |
| DATED | : February 12, 2008 |
| INVENTOR(S) | : Hideki Sakata et al. |

Page 1 of 1

It is certified that error appears in the above-identified patent and that said Letters Patent is hereby corrected as shown below:

Column 8, Line 57, change "side." to --cache.--.

Column 9, Line 8, change "processor" to --processor,--.

Column 10, Line 7, after "processor" delete "system".

Column 10, Line 10, after "processor" delete "system".

Column 10, Line 16, before "entry" change "the," to --the--.

Signed and Sealed this

Twenty-ninth Day of July, 2008

JON W. DUDAS
*Director of the United States Patent and Trademark Office*